(12) United States Patent
Lin

(10) Patent No.: US 7,529,048 B2
(45) Date of Patent: May 5, 2009

(54) OPTICAL FILM HAVING MULTI-STORY PRISMS AND MANUFACTURING PROCESS THEREOF

(76) Inventor: Ching-Bin Lin, 2F-2, No. 12, Lane 88, Min-Sheng E. Road, Sec. 3, Taipei (TW)

( * ) Notice: Subject to any disclaimer, the term of this patent is extended or adjusted under 35 U.S.C. 154(b) by 353 days.

(21) Appl. No.: 11/366,870

(22) Filed: Mar. 3, 2006

(65) Prior Publication Data

US 2007/0206913 A1   Sep. 6, 2007

(51) Int. Cl.
G02B 5/04   (2006.01)

(52) U.S. Cl. .................. 359/831; 359/833; 359/837; 359/625; 362/620

(58) Field of Classification Search ............ 359/831, 359/833, 837, 454, 569, 592, 593, 599, 613, 359/615, 619, 625, 626, 627; 362/620, 626
See application file for complete search history.

(56) References Cited

U.S. PATENT DOCUMENTS 2,317,988 A * 5/1943 Forssberg ................ 359/834
5,600,455 A * 2/1997 Ishikawa et al. ............. 349/57
6,626,544 B2 * 9/2003 Lu et al. .................... 359/530
6,692,133 B2 * 2/2004 Katsu et al. ................ 362/620
6,724,535 B1 * 4/2004 Clabburn ................... 359/619
6,798,574 B2 * 9/2004 Kim .......................... 359/566
7,075,722 B2 * 7/2006 Nakai ........................ 359/571
7,297,386 B2 * 11/2007 Suzuki et al. .............. 428/141
7,330,315 B2 * 2/2008 Nilsen ....................... 359/640
7,382,537 B2 * 6/2008 Lin ........................... 359/625
2007/0195421 A1 * 8/2007 Lin ........................... 359/619
2007/0206298 A1 * 9/2007 Lin ........................... 359/831
2008/0088933 A1 * 4/2008 Lin ........................... 359/599

* cited by examiner

Primary Examiner—Ricky D Shafer

(57) ABSTRACT

An optical film includes a supporting layer and a structured-surface layer having a plurality of prims juxtapositionally formed on the supporting layer, each prim including a lower prism element bonded with the supporting layer and at least one upper prism element integrally superimposed on the lower prism element to increase the prism height in order to pick up sideward refracted light to reduce light loss in order to enhance brightness of the optical film.

7 Claims, 10 Drawing Sheets

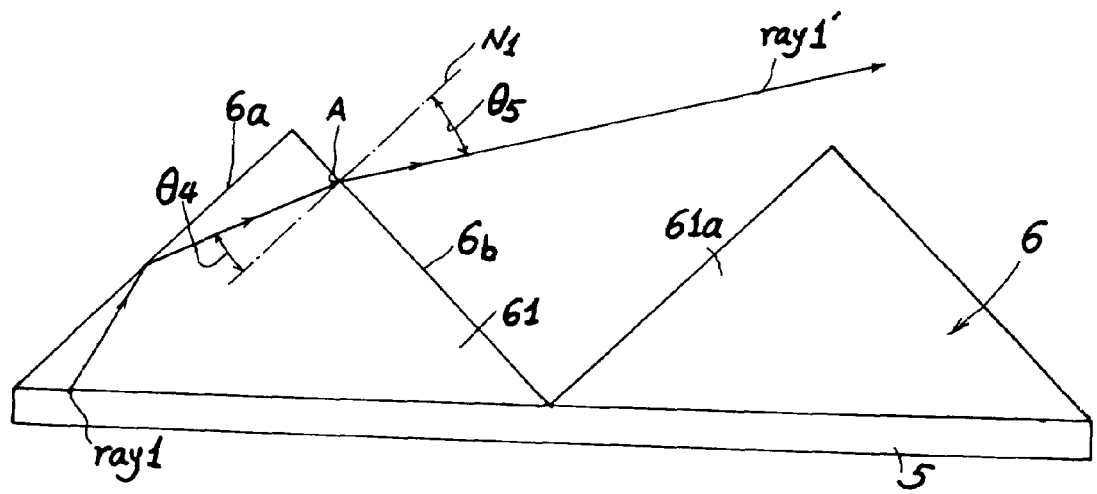
Fig. 1  PRIOR ART
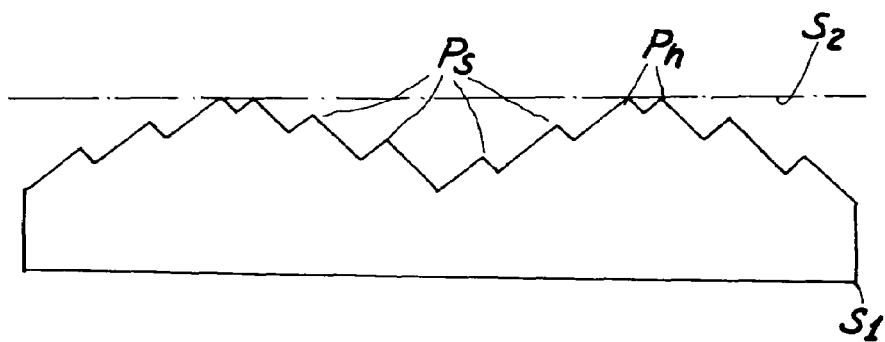
PRIOR ART  Fig. 2

OPTICAL FILM HAVING MULTI-STORY PRISMS AND MANUFACTURING PROCESS THEREOF

BACKGROUND OF THE INVENTION

A conventional optical film as shown in FIG. 1 comprises a supporting layer 5 and a prismatic layer 6 formed on the supporting layer 5.

When an incoming light ray1 enters the prism 61 of this first prior art, ray1 will be reflected from an inside surface of a first dihedral face 6a and projected towards a second dihedral face 6b of the prism 61 through a light path having an incidence angle $\theta_4$ from a normal line N1 perpendicular to point A on the second face 6b. Then, an outgoing light ray1' will be refracted outwardly from the second face 6b at point A through a refracted angle $\theta_5$ from the normal line $N_1$. The outgoing light ray1' has been refracted outwardly above an apex of a neighboring prim 61a and can not be picked up by the neighboring prism 61a, thereby causing light loss of the optical film.

U.S. Pat. No. 5,771,328 disclosed a light directing film having variable height structured surface in order to inhibit visible optical coupling when adjacent sheets of light directing film are nearly contacted. An example of this second prior art (U.S. Pat. No. 5,771,328) is illustrated in FIG. 2 of this application. In this second prior art, the taller prisms Ph of the first sheet $S_1$ of film will limit the physical proximity of a second sheet of film $S_2$ when contacted with the structured surface of the first sheet of film $S_1$ to reduce the likelihood of undesired optical coupling (on the shorter prisms Ps) between the structured surface of the first sheet $S_1$ with the adjacent second sheet of film $S_2$.

However, the variations in the height of the shorter prisms Ps as shown in FIG. 2 may still appear as visible lines on the surface of a film, which are visible by human eyes. Therefore, the optical defects as found in the second prior art are still expected to be overcome.

The present inventor has found the drawbacks of the prior art, and invented the present optical film to overcome the drawbacks of the prior arts.

SUMMARY OF THE INVENTION

The object of the present invention is to provide an optical film including a supporting layer and a structured-surface layer having a plurality of prims juxtapositionally formed on the supporting layer, each prim including a lower prism element bonded with the supporting layer and at least one upper prism element integrally superimposed on the lower prism element to increase the prism height in order to pick up sideward refracted light to reduce light loss in order to enhance brightness of the optical film.

BRIEF DESCRIPTION OF THE DRAWINGS

FIG. 1 shows a conventional optical film of a first prior art.

FIG. 2 shows a second prior art.

DETAILED DESCRIPTION

Figure 3:
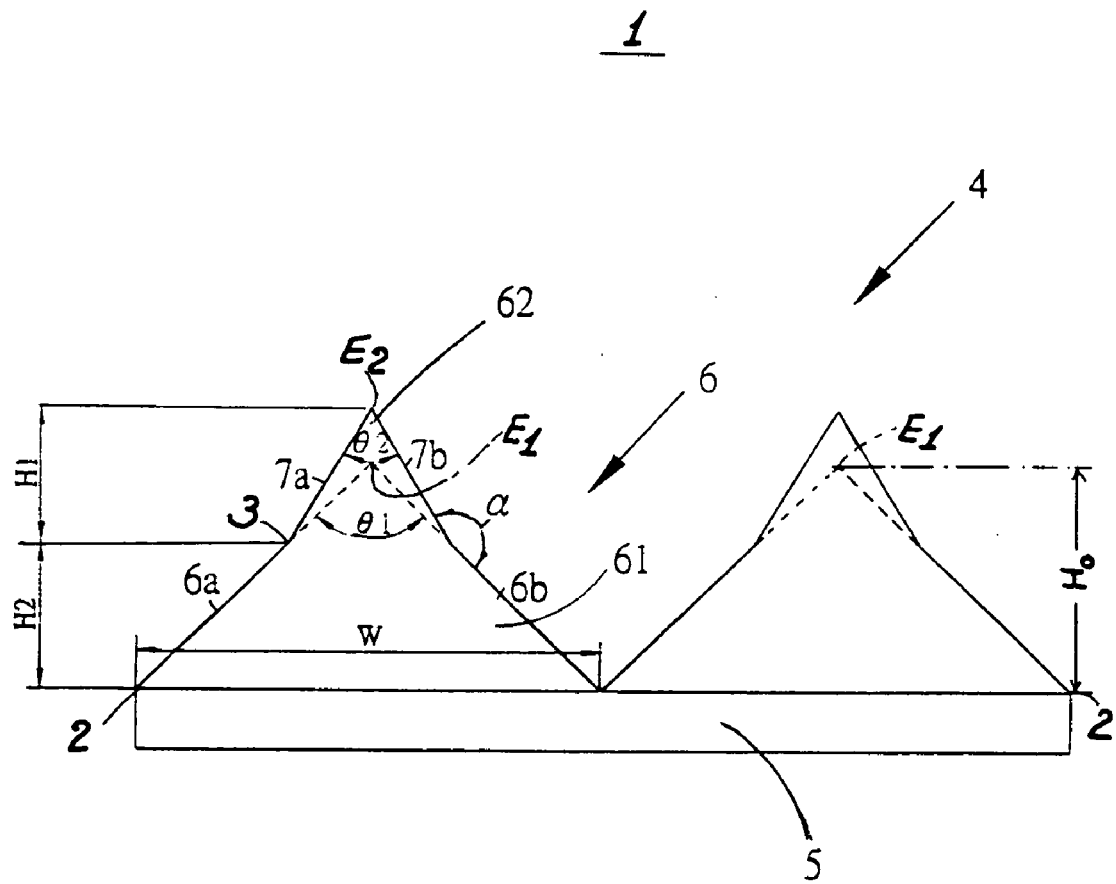
FIG. 3 shows a first preferred embodiment of the present invention.

As shown in FIG. 3, a first preferred embodiment of optical film 1 of the present invention comprises: a supporting layer 5 made of high transparency or light transmmissive materials and having good structural strength durable for resisting temperature, aging and scratching; and a structured-surface layer 4 formed on the supporting layer 5 including a plurality of prisms 6 juxtapositionally formed on the supporting layer 5.

The materials and process for making the supporting layer 5 and the structured-surface layer 4 will be further described hereinafter.

Each prism 6 includes: a lower prism element 61 integrally formed with the supporting layer 5 and having two lower dihedral faces 6a, 6b disposed on opposite sides (such as a left side and a right side) of the lower prism element 61 and cooperatively defining a first apex angle $\theta_1$ between the two lower dihedral faces 6a, 6b; and at least an upper prism element 62 integrally superimposed on the lower prism element 61 and having two upper dihedral faces 7a, 7b disposed on opposite sides of the upper prism element 62 and cooperatively defining a second apex angle $\theta_2$, which is preferably smaller than the first apex angel $\theta_1$ of the lower prism element 61, between the two upper dihedral faces 7a, 7b; with the lower prism element 61 having the two lower dihedral faces 6a, 6b interpolatively intersected to form a first apex $E_1$ positioned below a second apex $E_2$ as intersected by the two upper dihedral faces 7a, 7b.

The first apex $E_1$ of the lower prism element 61 is encompassed by the two upper dihedral faces 7a, 7b of the upper prism element 62.

Each lower face 6a or 6b disposed on each side (such as a left or a right side) of the lower prism element 61 and each upper face 7b or 7b disposed on each side of the upper prism element 62 corresponding to the same side of the lower prism element 61 cooperatively define an obtuse angle or a curvature α between each lower face 6a or 6b and each upper face 7a a or 7b.

The upper prism element 62 is integrally superimposed on the lower prism element 61 to increase the total height of the two prism elements 61, 62 to simulate a two-story (or two layers) prismatic structure.

If an upper height $H_1$ is defined between the second apex $E_2$ of the upper prism element 62 and an intersection 3 between the upper face 7a (or 7b) and the lower face 6a (or 6b); and a lower height $H_2$ is defined between the intersection 3 and an interface 2, 2 (between the structured-surface layer 4 and the supporting layer 5), the total height ($H_1+H_2$) of the two prism elements 62, 61 will be increased to be taller than the original height $H_0$ of the "single-story prism" 61 as dotted line shown in FIG. 3 ($H_1+H_2>H_0$).

The increased height of the two-story or multi-story prism as taught by the present invention will effectively pick up or "catch" the sideward refracted light such as hereinafter explained and illustrated in FIG. 4 to prevent light loss; or, in other words, to enhance the brightness or luminous flux of an optical film to be superior to the prior art especially as shown in FIG. 1.

Figure 13:
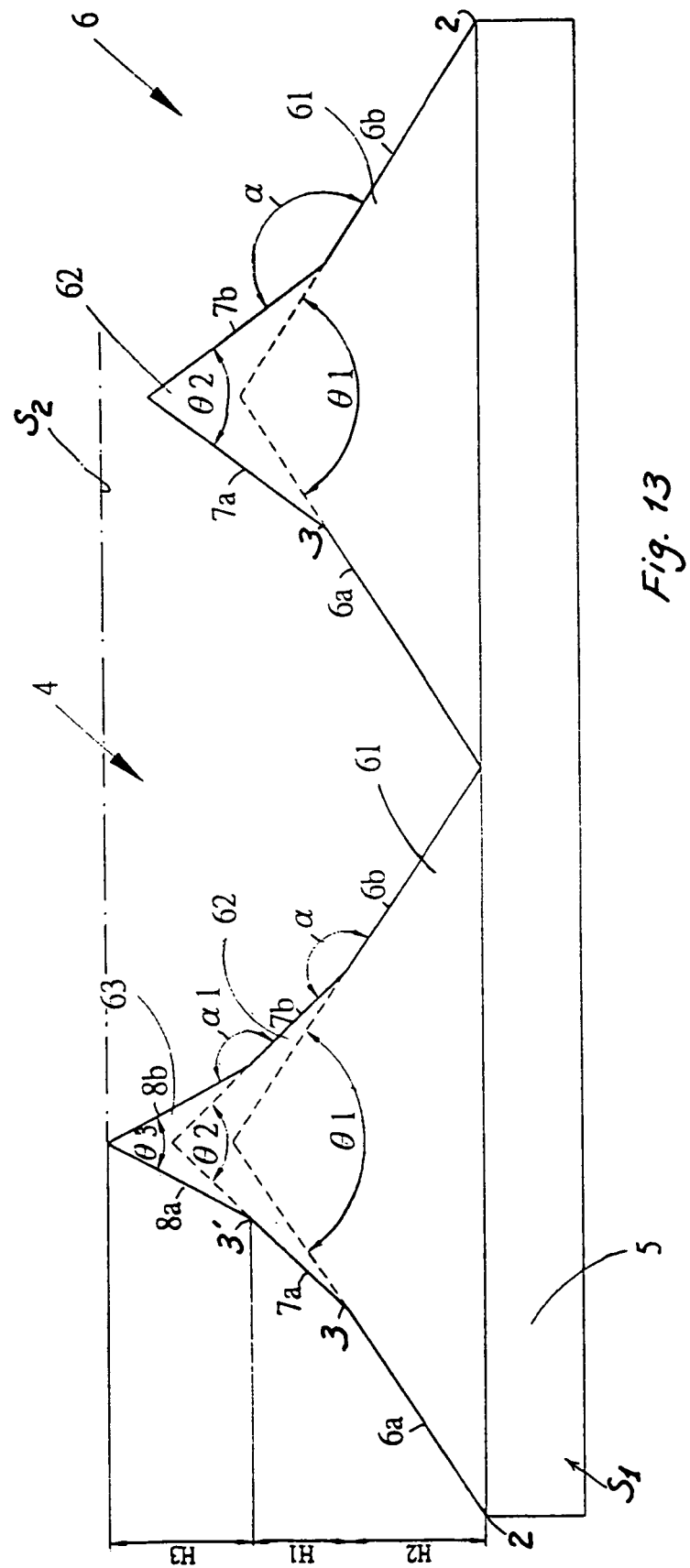
FIG. 13 shows a sixth preferred embodiment of the present invention.

Meanwhile, the taller prism 6 as effected by the present invention, when contacted with a second sheet of light guiding film of a display, will limit the physical proximity of the second sheet of film to thereby reduce the optical coupling or wet-out between the surfaces of two contacted films (such as shown in FIG. 13 and described hereinafter).

The intersection 3 between the upper face 7a or 7b and the lower face 6a or 6b of this invention is a curvature or obtuse angle, not sharply-angled variations of height of the shorter prisms Ps as shown in the prior art in FIG. 2, will substantially reduce the visibility to the human eye of the lines on the surface of the film as caused by the variations of prim height of the prior art. So, this invention may also reduce the optical coupling or wet-out defects without affecting the brightness of the optical film.

The base width W of the prism 61 and the ratio of the two heights $H_1/H_2$ may be varied according to the practical requirements, or may be adjusted depending upon the desired control of light loss, the desired brightness and the luminous flux of the optical film, not limited in the present invention.

The upper structured-surface layer 4 of the present invention may be made of polymers, and may comprise the ingredients; diluters, oligomers, monomers, photoinitials and additives including surfactant, anti-static electricity agent, etc. The structured-surface layer 4 may be selected from curable resin including photo-curing resin and heat-curing resin to be coated on the supporting layer 5, not limited in the present invention.

The materials for making the lower prism element 61 and the upper prism element 62 may be the same materials, having no interface formed between the upper and lower prism elements 62, 61. Upon integral molding, the structured surface including the two stories of prism elements 61, 62 may be integrally formed on the upper layer 4 above the supporting layer 5.

Since the upper prism element 62 is vulnerably subjected to abrasion or scratch by other optical elements, the upper prism element 62 or the "upper story" or the peak portion of the prism 6 may be made of anti-scratching materials, which will be further described hereinafter. By the way, only the upper prism element 62, as easily subjected to serious scratching or abrasion, is made of anti-scratching materials for saving production cost.

The supporting layer 5 may be made of the following most popularly used plastic or composite materials: Polyethylene Terephthalate (PET), polycarbonate (PC), styrene-acrylonitrile, cellulose acetate butyrate, cellulose acetate propionate, cellulose triacetate, polyether sulfone, polymethyl methacrylate, polyurethane, polyester, polyvinyl chloride, polystyrene, polyethylene naphthalate, etc.

If the lower (or first) prism layer is made of curable resin including photocuring and heat-curing resin and the upper (or second) prism layer made of anti-scratching materials is then coated on the lower prism layer, an optical film having anti-scratching property can be made in accordance with the present invention.

The upper (or second) layer may be made of nano composite comprised of a cross-linking polymer matrix and nano inorganic filler (or particles). The polymer matrix may comprise diluter, oligomers, monomers, photoinitial and additives as aforementioned. The nano inorganic particle has a refractive index preferably greater than 1.56. The nano inorganic particles may be surface modified and homogeneously dispersed in the polymer matrix to form the composite having better abrasion or scratch resistance.

The nano inorganic filler (particle) may have a particle size ranging from 1 nm through 100 nm and may be selected from: aluminum, stannic oxide, antimony oxide, silica, zirconia and titania or their mixtures.

A nano polymer composite may be preferably chosen for this invention, which comprises:
1. Polyurethane acrylate oligomer, PUA (M; 160 g). . . 65 wt %
2. Diluter of hexanediol diacrylate . . . 28 wt %
3. Photoinitial of hydroxyphenyl ketone . . . 2 wt %
4. Photoinitial of acylphosphine oxide . . . 1 wt %
5. Hydrophilic clay or beidelite . . . 2 wt %
6. Clay surface modifier of acrylate functionalized alkylammonium . . . 0.5 wt %

The nano composite with polymer matrix of the present invention may be prepared by the following steps:
1. Adding nano clay as surface modified into UV curable acrylic resin at 45° C.;
2. Thoroughly blending the mixture of resin and clay surface modifier with a high-speed mixing agitator; and
3. Placing an uncured nano composite containing polymer matrix and well dispersed nano clay particles in an ultrasonic tank at 25° C. for 5 hours without being subjected to light exposure.

A typical process for making the anti-scratching optical film of the present invention may comprise the following steps:
1. Preparing a nano composite with polymer matrix;
2. Coating a first or lower layer of curable resin on a supporting layer;
3. Further coating a second or upper layer of said nano composite on said first layer of curable resion to form a laminated film;
4. Molding or forming a structured surface such as the prismatic pattern of the present invention on the second layer of the laminated film to form an optical film, which is then cured and released from the mold.

The brightness enhancement as effected by the present invention can be clearly observed in view of FIGS. 4~6 and the description as explained hereinafter. The conventional prism of single-story prism and the refracted light path passing therethrough is shown in dotted lines in FIGS. 4~6.

Figure 4:
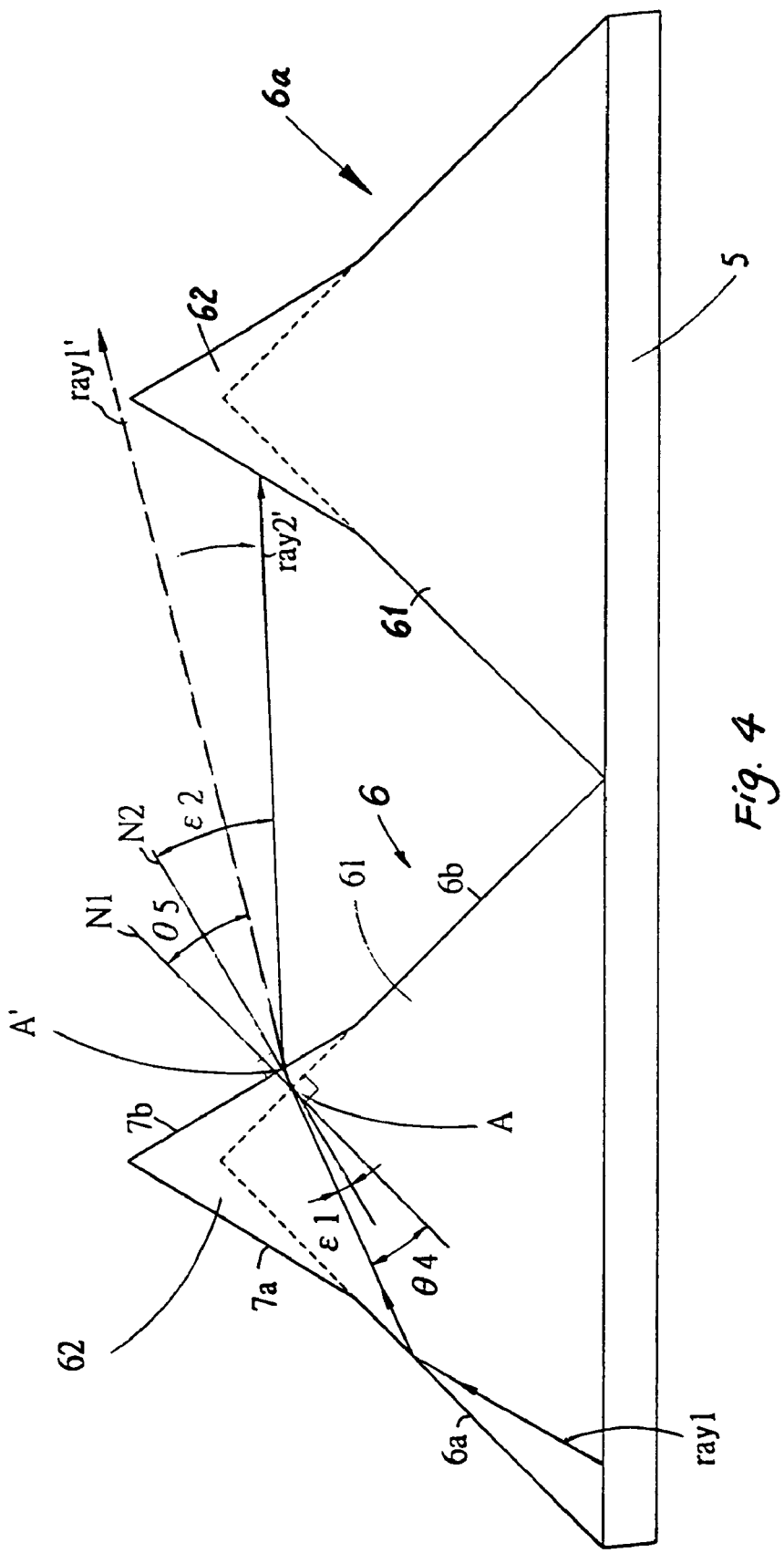
FIG. 4 is an illustration showing the pick-up of a sideward refracted light in accordance with the present invention.

In FIG. 4, the light is refracted by the conventional single-story prism 61 from the incoming light ray1 to be the outgoing refracted light ray1' is shown in dotted line and is also shown in FIG. 1 as aforementioned. The outgoing light ray1' is sideward refracted above the rib or peak of the neighboring prism 6a, being not picked up by the adjacent prism to thereby cause light loss.

Comparatively, the incoming light ray1, after entering the double-story prism 6 of this invention and being reflected from the dihedral face 6a, will be projected towards an upper dihedral face 7b of the upper prism element 62 through a light path having an incidence angle $\epsilon_1$ from a normal line $N_2$ perpendicular to point A' on the upper face 7b. Then, an outgoing light ray2' will be refracted outwardly from the upper face 7b at point A' through a refracted angle $\epsilon_2$ from the normal line $N_2$. The outgoing light Ray2' of this invention is refracted outwardly to be transmitted into the neighboring prism 6a. Namely, the outgoing refracted light of this invention is "caught" by the adjacent prism (especially having the upper prism element 62 superimposed above the lower prism element 61) without causing light loss to thereby increase the brightness and luminous flux of the present invention.

Figure 5:
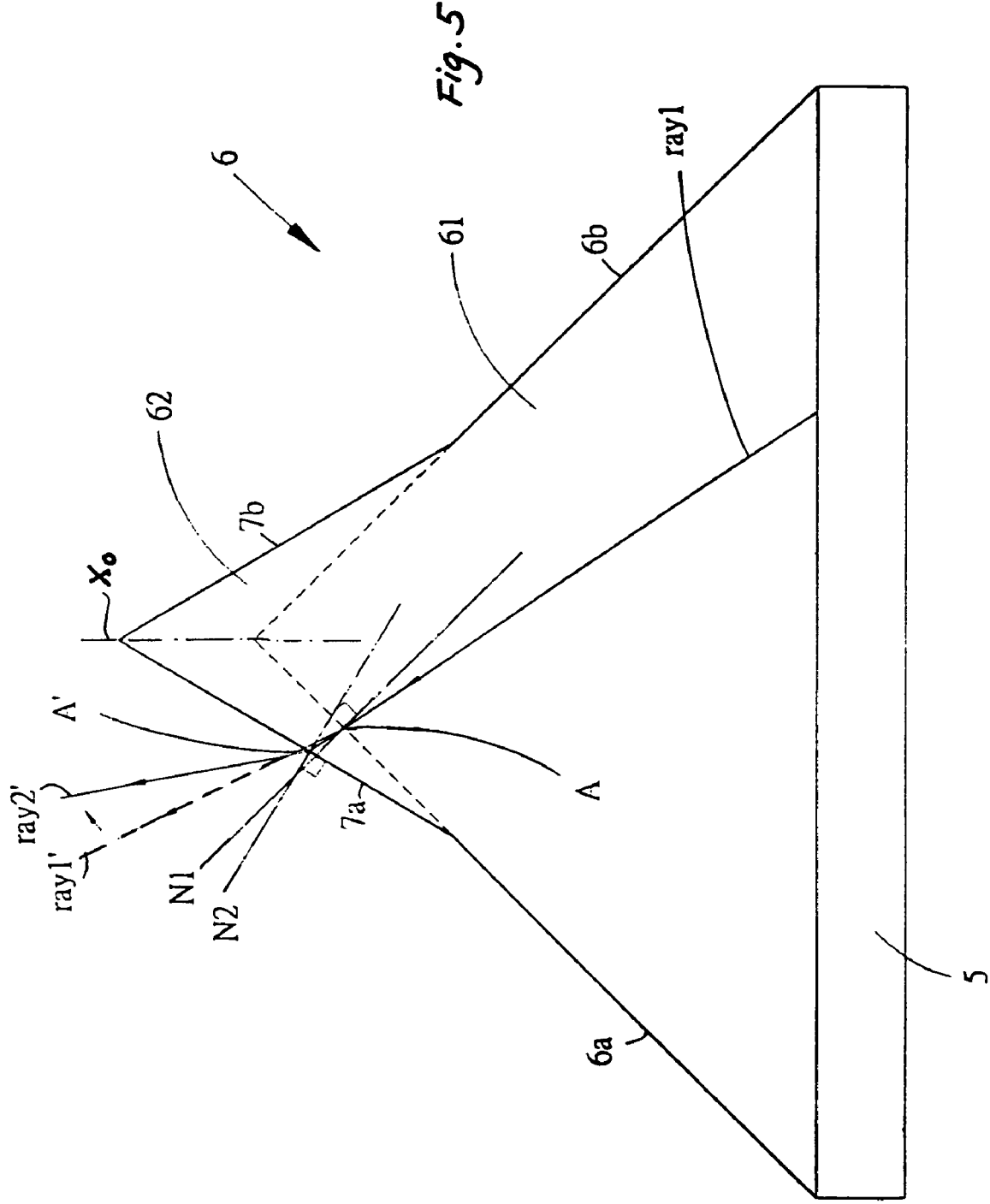
FIG. 5 is an illustration showing the guiding of light towards the on-axis of a display as effected by the present invention.

As shown in FIG. 5, the incoming light ray1, when passing through the conventional single-story prism 61, will be projected towards point A on the dihedral face 6a along a light path having a first normal line $N_1$ perpendicular to the point A. Then, an outgoing light ray1' will be refracted outwardly from the face 6a at point A to be deviated from an on-axis $X_0$ of a display.

Comparatively, the incoming light ray1, after entering the double-story prism 6 of the present invention will be refracted outwardly upwardly from the upper face 7a of the upper prism element 62 at point A' along another light path having another normal line $N_2$ perpendicular to the point A'. Then, the outgoing light ray2' is refracted outwardly upwardly to approach the on-axis $X_0$ of a display (to be closer to the on-axis $X_0$ in comparison with the conventional ray1'), thereby increasing the brightness of the display.

Figure 6:
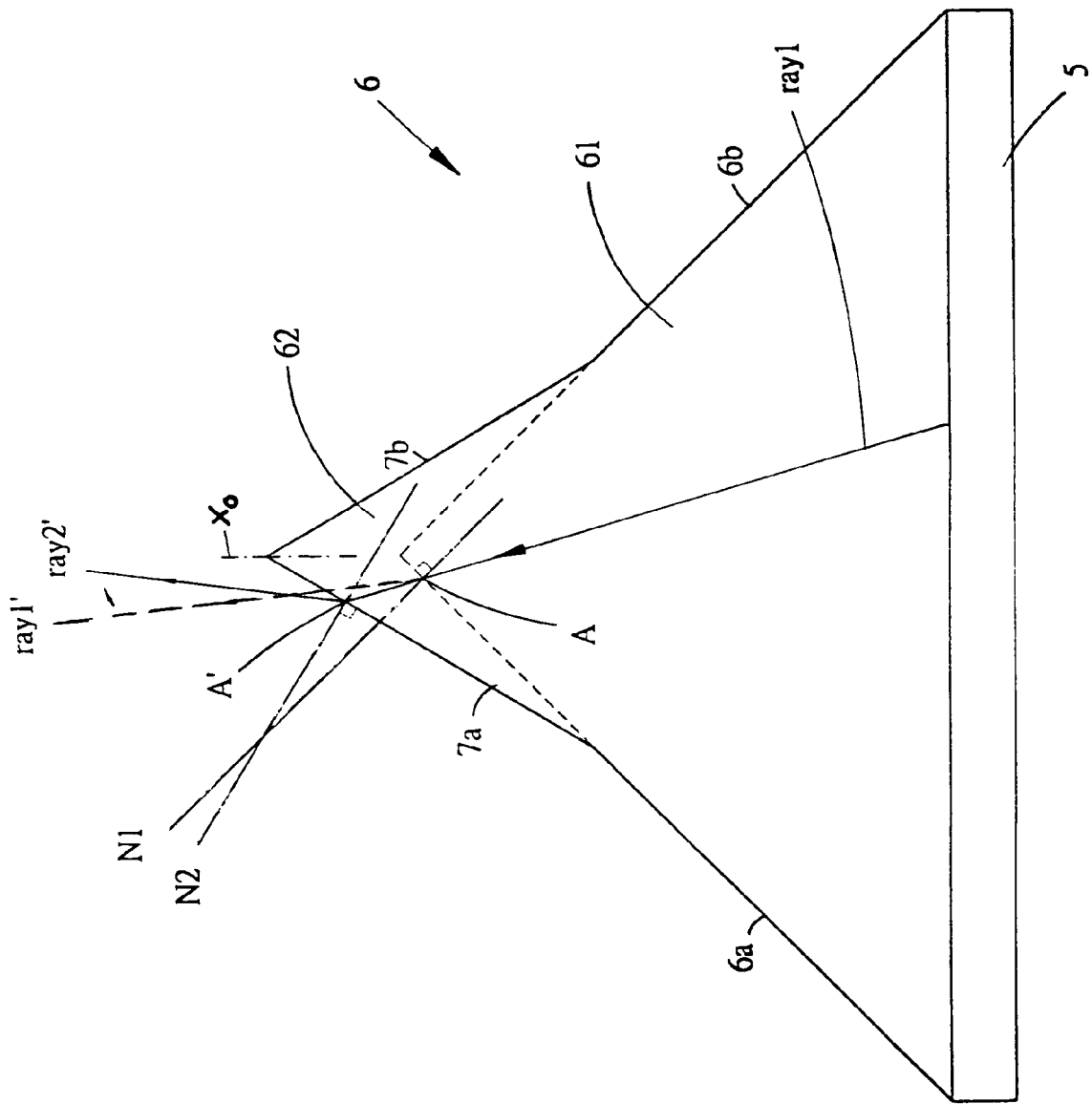
FIG. 6 shows another way for guiding light towards the on-axis of the display in accordance with the present invention.

Another light path passing through the double-story prism 6 of the present invention is further shown in FIG. 6, in which the light ray2' as refracted from the upper prism element 62 of this invention will be guided outwardly upwardly to be closer to the on-axis $X_0$ of the display than the light ray1' through a conventional single-story prism 61, thereby indicating an increase of the brightness of the display as effected by the present invention.

In addition to the brightness enhancement as effected by the present invention, the multi-story prism 6 of the present invention has its taller prism element (i.e., the upper prism element 62) provided for limiting a physical proximity of an adjacent film sheet so as to reduce the optical coupling between the shorter prisms of the film $S_1$ with another adjacent film $S_2$, as being clearly illustrated in FIG. 13.

Figure 9:
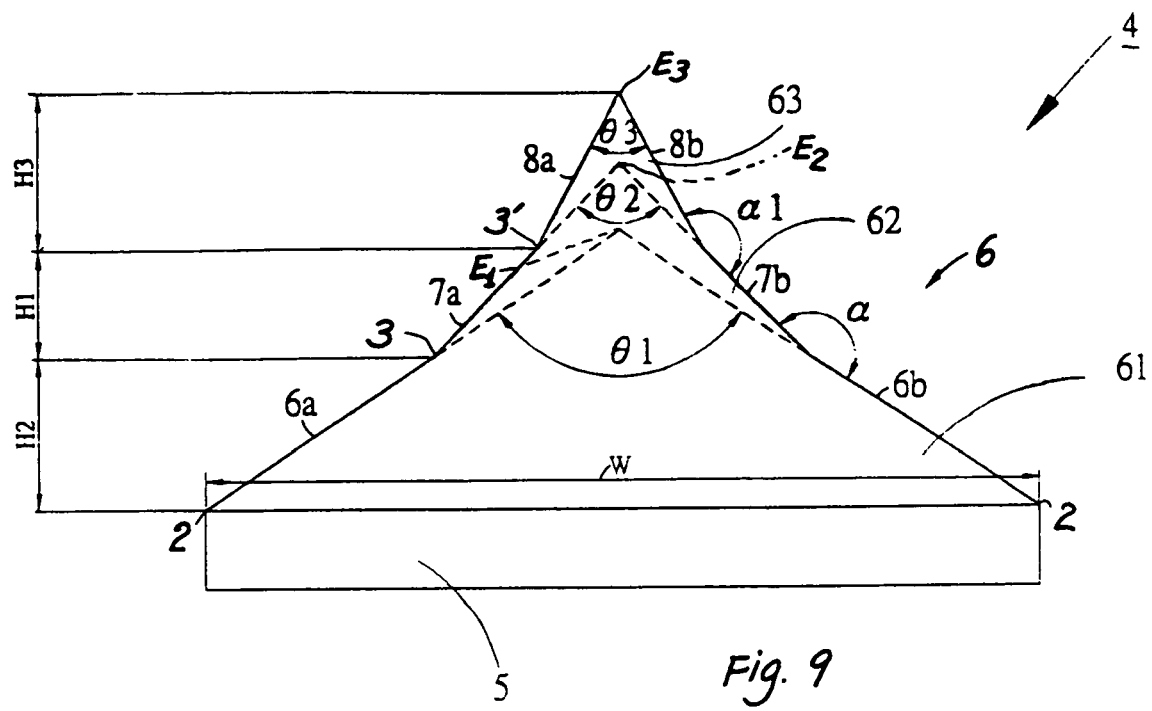
FIG. 9 shows a second preferred embodiment of the present invention.

The number of stories for the multi-story prism 6 are not limited in the present invention. In FIG. 9 and FIG. 13, there is showing triple-story and double-story prisms in accordance with the present invention. The arrangements of prisms including variations of prism heights, pitches, orientations, shapes, etc., are not limited in this invention.

The first (or lower) apex angle $\theta_1$ of the lower prism element 61 is preferably larger than the second (or upper) apex angle $\theta_2$ of the upper prism element 62 to "narrow" the width of the upper prism element for enhancing the optical effects of this invention including the reduction of optical coupling defect.

Figure 7:
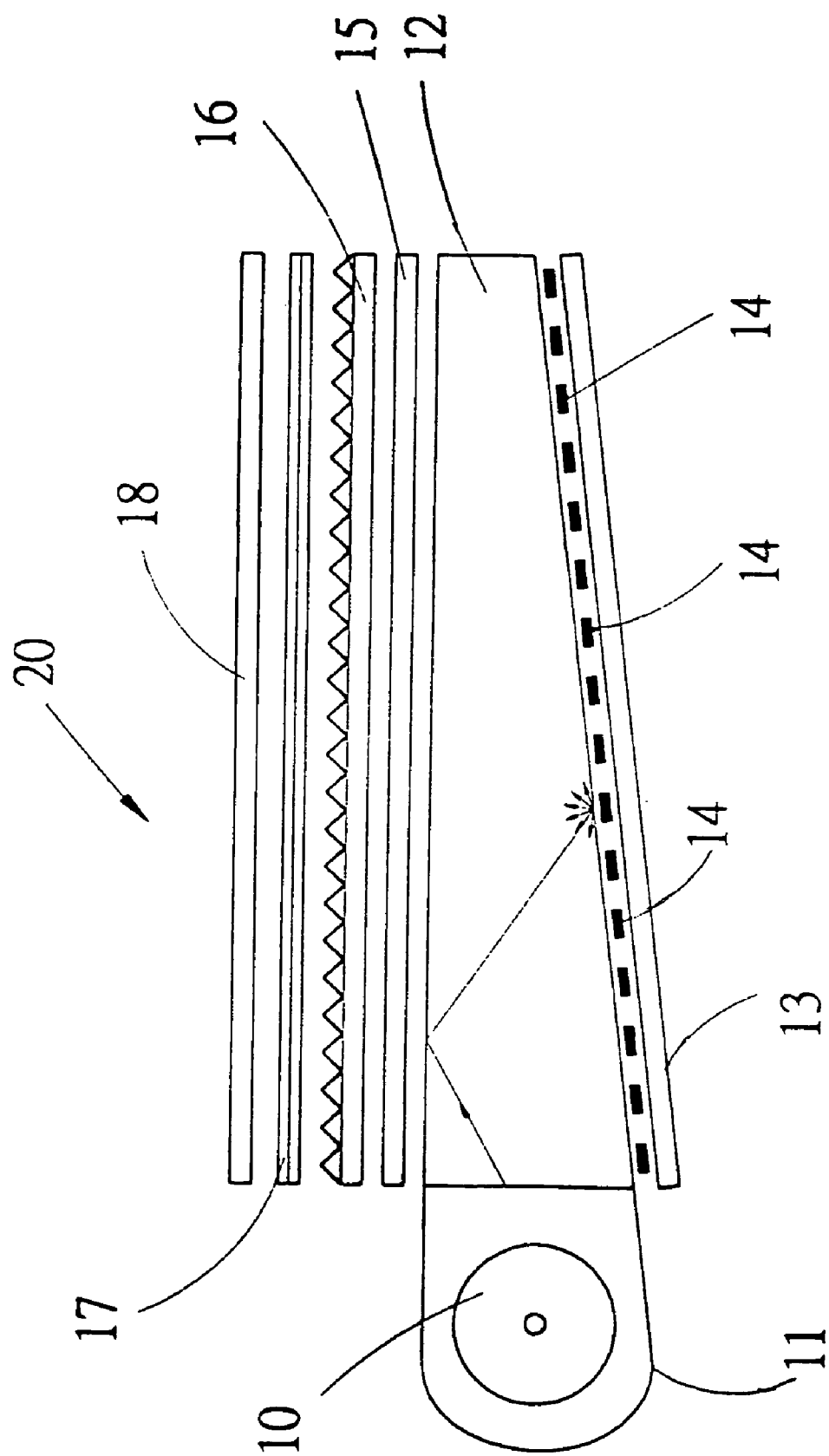
FIG. 7 shows a backlight module for optical simulation to be used in the present invention.

As shown in FIG. 7, a backlight module 20 for optical simulation (accompanied with TracePro simulation software) may be applied for testing or evaluating the brightness of the optical films of the present invention.

The backlight module 20 as shown in FIG. 7 includes: a light source 10 having a reflector 11 secured with the light source 10, a light guide 12 juxtapositioned to the light source 10 for upwardly directing light as projected from the light source 10, a reflection sheet 13 having a plurality of scattering dots 14 formed on the sheet 13 and positioned beneath the light guide 12 for reflecting light upwardly through the guide 12 to prevent from light loss and to enhance the light utilization efficiency, a diffuser sheet 15 positioned above the light guide 12 for uniformizing luminescence, a pair of prism sheets 16, 17 stacked above the diffuser sheet 15 for collecting the diffused light for increasing the brightness, and a display unit 18 provided on top of the stacked prism sheets 16, 17.

The ribs of the upper prism sheet 17 may be perpendicular to that of the lower prism sheet 16.

The light source 10 is mounted on a side of the light guide 12 and may be selected from the group consisting of: cold cathode fluorescent lamp (CCFL) and light emitting diode (LED).

Figure 8:
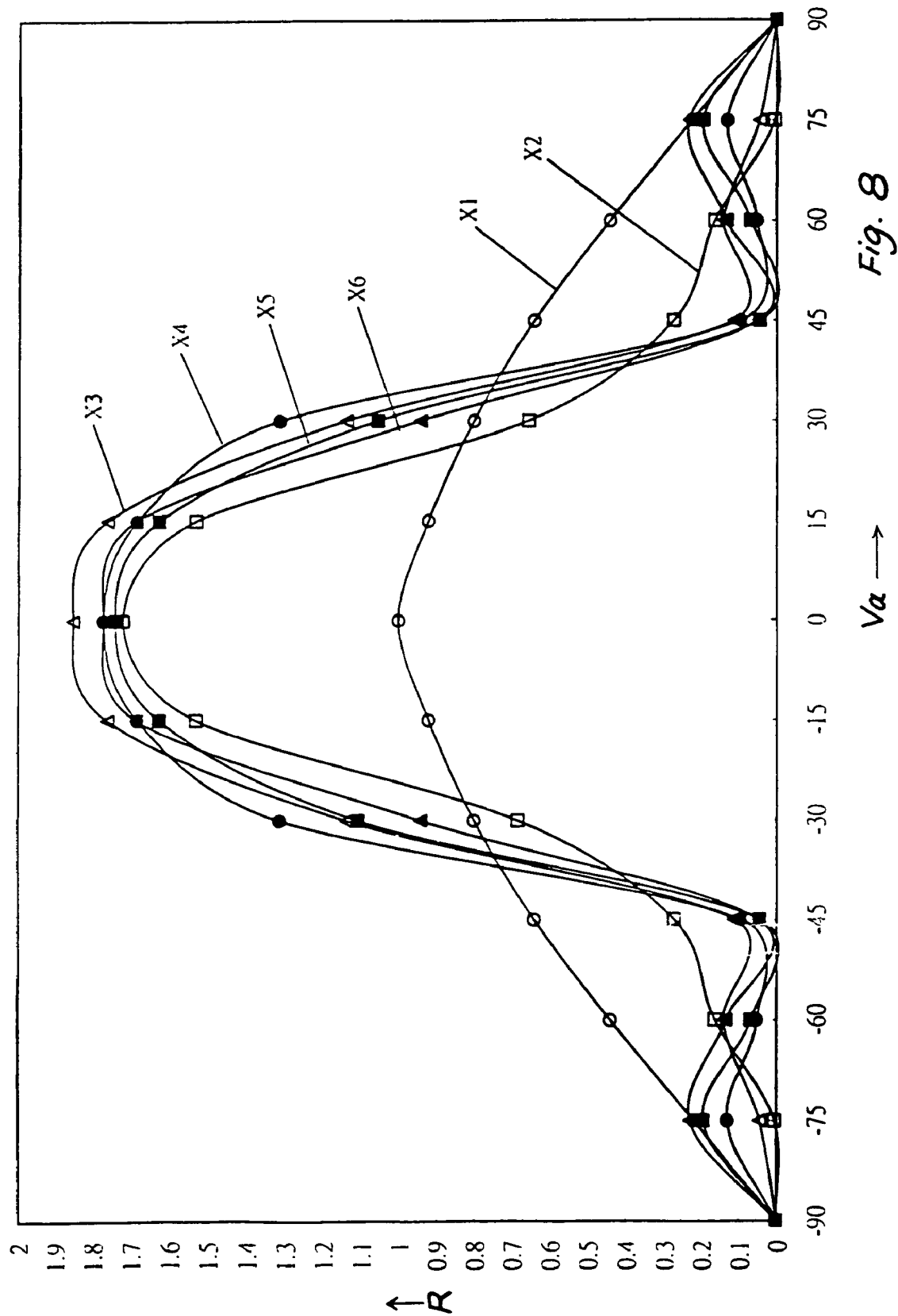
FIG. 8 shows the relationship of ratio to on-axis light intensity (R) versus the viewing angle (Va) for plural tests in accordance with the present invention.

By using the backlight module 20 as shown in FIG. 7 and by means of TracPro simulation software, the relative brightness for a plurality of optical films including the examples of this invention, as hereinafter described, will be primarily tested to obtain their simulated testing results (namely the rectangular candela distribution plots) which are shown in FIG. 8, in which the ordinate R indicates the ratio to on-axis brightness (or light intensity) versus different viewing angles (degrees) Va on the abscissa.

EXAMPLE FOR REFERENCE

First, the two stacked prism sheets 16, 17 are eliminated or removed from the module 20 as shown in FIG. 7. Then, a testing simulation result is obtained as shown on the Curve $X_1$ as shown in FIG. 8. Curve $X_1$ will serve as a "datum reference" for the subsequent tests.

EXAMPLE OF CONTROL TEST

Then, two stacked prism sheets 16, 17 (without forming the multi-story prism 6 having lower and upper prism elements 61, 62 as taught by this invention) are installed to be the module 20 as shown in FIG. 7 in between the display unit 18 and the diffuser sheet 15. Another testing simulation data is obtained as shown on the Curve $X_2$ as shown in FIG. 8, in which the brightness is increased in comparison with the "datum reference" $X_1$ by the module without being implemented with the stacked prism sheets 16, 17, especially when viewed at zero viewing angle (Va=0).

The curve X2 will serve as a control test reference for checking the brightness of the optical films of the present invention as hereinafter described.

Example 1

Referring to the prism 6 as shown in FIG. 3 of the present invention, several design data of the related parts or elements of this embodiment are given as follows:
1. The first apex angle, $\theta_1$ ... 104°;
2. The second apex angle, $\theta_2$ ... 90°;
3. Base width of the prism, W ... 50 μm;
4. Height ratio, $H_1/H_2=1/6$.

The process for making the film and the prisms 6 is not limited in this invention. The prism 6 should be made of materials of high transparency, such as acrylic resin having a refractive index of 1.494.

Two optical films as made by this example are stacked having their ribs of the upper and lower films oriented to be perpendicular with one another to be the stacked films 16, 17 as shown in FIG. 7. By conducting the optical simulation test as explained in the foregoing examples, a simulation test result is obtained and shown on curve X3 in FIG. 8 to indicate an enhanced brightness or light intensity than that of the control Test (X2). The testing result will be summarized in a Table as listed hereinafter.

Example 2

Example 1 is repeated, except that the design data have been modified or maintained as follows:
1. First apex angle, $\theta_1$ ... 104°;
2. Second apex angle, $\theta_2$ ... 94°;
3. Prism width, W ... 50 μm;
4. Height ratio, $H_1/H_2=1/6$.

Two films of this example are stacked to be conducted for simulation test to obtain the result of curve $X_4$ as shown in FIG. 8.

Example 3

Example 2 is repeated, except the height ratio, $H_1/H_2$, is adjusted to be: ½. A testing result is obtained as curve $X_5$ as shown in FIG. 8.

Example 4

Example 2 is repeated, except that the height ratio, $H_1/H_2$, is adjusted to be: ⅔. A testing result is obtained as curve $X_6$ as shown in FIG. 8.

The testing results of the above-mentioned Examples are now summarized in the following Table, in which the viewing angle is designated as 0 (Va=0); and curve X1 of Example for Reference is considered as a reference to have a denominator of "1" for the following related ratio:

TABLE

| | Ratio | | |
|---|---|---|---|
| Examples | Ratio of luminous intensity | Ratio of luminance | Ratio of luminous flux |
| Example for Reference | 1.0 | 1.0 | 1.0 |
| Example of Control Test | 1.72 | 1.55 | 1.62 |
| Example 1 | 1.85 | 1.73 | 1.89 |
| Example 2 | 1.77 | 1.65 | 1.84 |
| Example 3 | 1.74 | 1.63 | 1.79 |
| Example 4 | 1.77 | 1.65 | 1.80 |

Conclusively, the present invention as demonstrated by the above-mentioned Examples 1~4 will exert an enhanced brightness and luminous flux in comparison with the conventional optical films.

A second preferred embodiment of the present invention is shown in FIG. 9 by adding a second upper (or uppermost) prism element 63 on the second prism element 62 to be a triple-story prism 6 in accordance with the present invention.

By the way, the lower or first prism element 61 defines a first apex angle $\theta_1$; the upper or second prism element 62 defining a second apex angle $\theta_2$, and the second upper (or third or uppermost) prism element 63 defining a third apex angle $\theta_3$ to have a preferable angular relationship as follows:

$\theta_1 > \theta_2 > \theta_3$.

An intersection 3 of obtuse angle or curvature α is defined between the lower dihedral face 6a (or 6b) and the upper face 7a (or 7b), and another upper intersection 3' of obtuse angle or curvature $\alpha_1$ being defined by the upper face 7a (or 7b) with the uppermost face 8a (or 8b).

By the way, three stories of prism elements will be obtained in this embodiment to have three sections, namely, a height $H_2$ between the intersection 3 and the interface 2; another height $H_1$ between the intersections 3, 3'; and still another height $H_3$ between the intersection 3' and the uppermost apex $E_3$.

Figure 10:
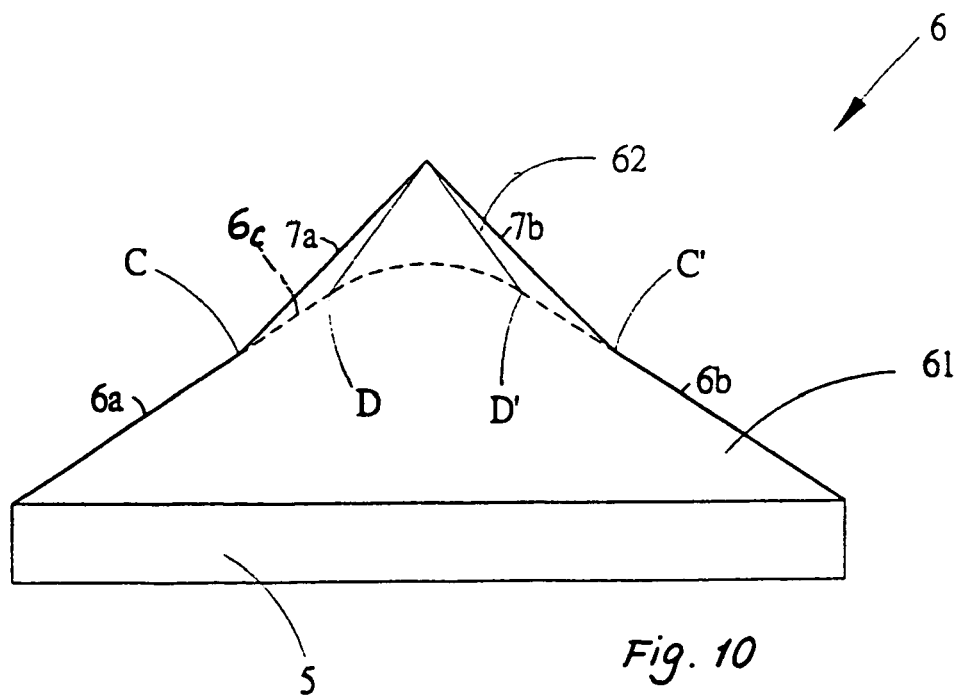
FIG. 10 shows a third preferred embodiment of the present invention.

As shown in FIG. 10, the lower prism element 61 has its peak portion modified to be a round portion 6c (dotted line shown) to superimpose the upper prism element 62 on the lower prism element 61 by intersecting two upper dihedral frees 7a, 7b with the two lower dihedral faces 6a, 6b at two intersections CC' or DD', not limited in this invention.

Figure 11:
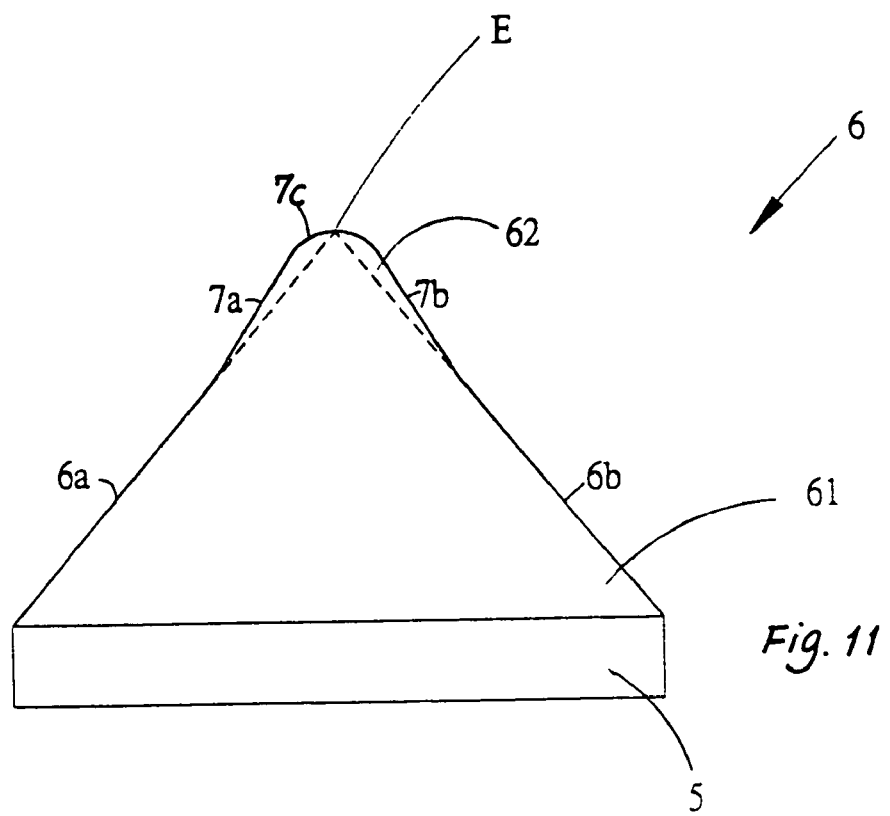
FIG. 11 shows a fourth preferred embodiment of the present invention.

In FIG. 11, a tip portion of the upper prism element 62 has been modified to be a round portion 7c to be another design choice to be different from the foregoing triangular prismatic tips.

Figure 12:
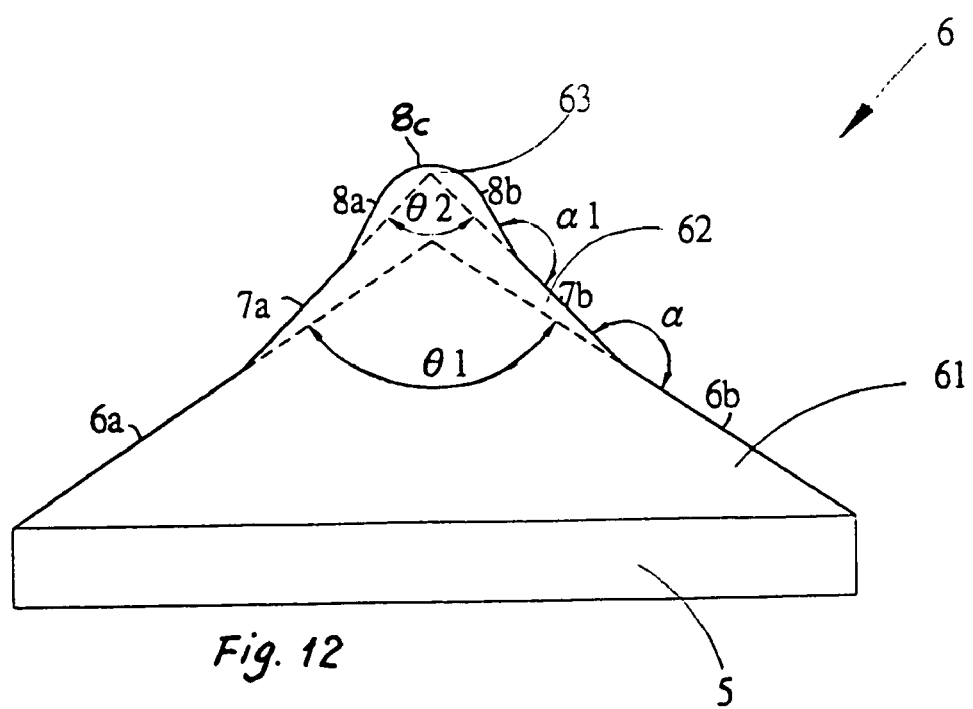
FIG. 12 shows a fifth preferred embodiment of the present invention.

In FIG. 12, the uppermost prism element 63 has been modified to form a round portion 8c at the tip of the uppermost prism element 63 to be another modification as slightly changed from that as shown in FIG. 9.

In FIG. 13, different heights of the multi-story prisms 6 of the present invention are made so as to reduce the optical coupling or wet-out optical defects.

The present invention may be further modified without departing from the spirit and scope of the present invention.

I claim:

1. An optical film comprising: a supporting layer; and a structured-surface layer formed on the supporting layer including a plurality of prisms juxtapositionally formed on the supporting layer; each said prism including: a lower prism element integrally formed with the supporting layer and at least an upper prism element integrally superimposed on said lower prism element to obtain a total height of the upper and lower prism elements to be taller than a height of the lower prism element for enhancing brightness of the optical film; said structured-surface layer having a first group of said prisms formed as triple-story prisms; each of said triple-story prisms includes said lower prism element integrally formed with the supporting layer, said upper prism element integrally superimposed on said lower prism element and a second uppermost prism element integrally superimposed on said upper prism element; and having a second group of said prisms each formed as double-story prisms to be shorter than each of said triple story prisms, wherein each of said double story prisms includes said lower prism element integrally formed with the supporting layer and said upper prism element integrally superimposed on said lower prism element.

2. The optical film according to claim 1, wherein said lower prism element includes two lower dihedral faces disposed on opposite sides of the lower prism element and cooperatively defining a first apex angle between the two lower dihedral faces; and said upper prism element as integrally superimposed on the lower prism element including two upper dihedral faces disposed on opposite sides of the upper prism element and cooperatively defining a second apex angle between the two upper dihedral faces; with the lower prism element having the two lower dihedral faces interpolatively intersected to form a first apex positioned below a second apex as intersected by the two upper dihedral face; said first apex of the lower prism element encompassed by the two upper dihedral faces of the upper prism element.

3. The optical film according to claim 2, wherein each said lower face disposed on each side of the lower prism element and each said upper face disposed on each side of the upper prism element corresponding to the same side of the lower prism element cooperatively define an obtuse angle or a curvature between each said lower face and each said upper face.

4. The optical film according to claim 2, wherein said second apex angle of said upper prism element is smaller than said first apex angle of said lower prism element.

5. The optical film according to claim 1, wherein said upper prism element has a tip portion formed as a triangular portion.

6. The optical film according to claim 1, wherein said upper prism element has a tip portion formed as a round portion.

7. The optical film according to claim 1, wherein said structured-surface layer includes said plurality of said prisms integrally formed on said supporting layer and said prisms having different heights among said prisms.

* * * * *